United States Patent [19]

Hergenrother et al.

[11] 4,218,556
[45] Aug. 19, 1980

[54] POLYPHOSPHAZENE COPOLYMERS CONTAINING TETRAALKYL ORTHOSILICATE SUBSTITUENTS AND A PROCESS THEREFORE

[75] Inventors: William L. Hergenrother, Akron; Adel F. Halasa, Bath, both of Ohio

[73] Assignee: The Firestone Tire & Rubber Company, Akron, Ohio

[21] Appl. No.: 941,115

[22] Filed: Sep. 8, 1978

[51] Int. Cl.$^2$ ............................................. C08G 79/02
[52] U.S. Cl. .................................... 528/168; 528/374; 528/399
[58] Field of Search ..................... 528/399, 168, 374

[56] References Cited

U.S. PATENT DOCUMENTS

| | | | |
|---|---|---|---|
| 3,702,833 | 11/1972 | Rose et al. | 528/399 |
| 3,888,799 | 6/1975 | Rose et al. | 528/399 |
| 4,026,839 | 5/1977 | Dieck et al. | 260/824 |
| 4,040,843 | 8/1977 | Franko-Filipasic | 106/15 FP |
| 4,055,523 | 10/1977 | Dieck et al. | 260/30.4 N |
| 4,055,545 | 10/1977 | Dieck et al. | 260/30.4 R |
| 4,061,606 | 12/1977 | Dieck et al. | 260/823 |
| 4,073,824 | 2/1978 | Dieck et al. | 260/23 |

FOREIGN PATENT DOCUMENTS 474615 7/1976 Australia .................................. 528/399

*Primary Examiner*—Wilbert J. Briggs, Sr.

[57] ABSTRACT

Polyphosphazene copolymers are prepared by a novel, simplified process which contain novel, randomly distributed units represented by the formulas:

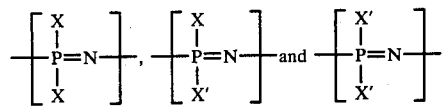

wherein X is —OSi(OR)$_3$ in which R is a branched, straight chain or cyclic alkyl group containing from 1 to 12 carbon atoms and mixtures thereof and wherein X' is selected from the group consisting of substituted and unsubstituted alkoxy, aryloxy, amino and mercapto groups. The alkyl groups may vary in carbon chain length or structure within the silicate or all be the same.

The copolymers of the invention can be utilized to form protective films and may also be utilized in applications such as for moldings, coatings, and the like. The copolymers of this invention also crosslink at room temperature in the presence of water.

6 Claims, No Drawings

POLYPHOSPHAZENE COPOLYMERS CONTAINING TETRAALKYL ORTHOSILICATE SUBSTITUENTS AND A PROCESS THEREFORE

BACKGROUND OF THE INVENTION

This invention relates to polyphosphazene copolymers containing repeating

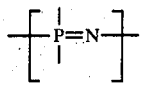

units in the polymer chain in which tetraalkyl orthosilicate substituents and substituted and unsubstituted alkoxy, aryloxy, amino or mercapto substituents are attached to the phosphorus atom and a process for the manufacture thereof. More particularly, the invention relates to polyphosphazene copolymers containing substituents derived from tetraalkyl orthosilicate and substituted and unsubstituted aliphatic and aromatic alcohols, amino compounds and mercaptan compounds, and a simplified process for the manufacture thereof.

Polyphosphazene polymers containing repeating

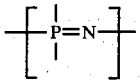

units in which various alkoxy, substituted alkoxy, aryloxy and substituted aryloxy groups are attached to the phosphorus atom and their method of preparation are described in the prior art as illustrated in the publication "Phosphorus-Nitrogen Compounds", Academic Press, New York, N.Y. 1972 by H. R. Allcock and "Poly(Organophosphazenes)", Chemtech, Sept. 19, 1975 by H. R. Allcock and in such U.S. Pat. Nos. as 3,515,688; 3,702,833; and 3,856,712.

However, none of the prior art of which applicants are aware, discloses or suggests polyphosphazene copolymers prepared from a tetraalkyl orthosilicate substituent reacting with a polydichlorophosphazene to give trialkyl silicate attached to the phosphorus atom in the random chain linkage of this invention or the simplified method of preparing such copolymers.

SUMMARY OF THE INVENTION

In accordance with this invention, novel polyphosphazene copolymers containing tetraalkyl orthosilicate and substituted or unsubstituted alkoxy, aryloxy, amino or mercapto substituents in this disclosed substitution relationship are prepared by a simplified process.

The copolymers of the invention contain randomly distributed repeating units represented by the formulas:

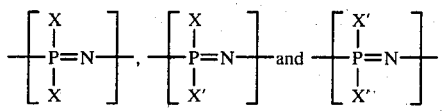

wherein X is —OSi(OR)$_3$, in which R is a branched, straight chain or cyclic alkyl radical containing 1 to 12 atoms or mixtures thereof, X' is selected from the group consisting of substituted and unsubstituted alkoxy, aryloxy, amino and mercapto radical or mixtures thereof, and the polymer can contain from 20 to 50,000 of such units. The R groups may vary in chain length within the silicate. The copolymer of this invention, as described above, differs from the prior art in the arrangement of the substituents on the phosphorus atom. This invention results in a copolymer in which the silicate and the alkoxy, aryloxy, amino or mercapto substituents are attached to the same phosphorus atom, a structure not disclosed in the prior art, see U.S. Pat. No. 3,702,833.

In the copolymer units represented by the above formulas, all X substituent groups may be the same or they may be mixed and all X' substituent groups may be the same or mixed. In the mixtures, the X substituent groups may be mixtures of different silicate groups and the X' substituent groups may be mixtures of different alkoxy, aryloxy, amino or mercapto groups.

The specific proportion of X to X' substituent groups incorporated in the copolymers of the invention may vary considerably depending upon the particular end use for which the copolymer is intended, chemical and physical properties desired, and the degree of crosslinking desired. In general, the copolymers may contain from about 0.1 to about 55 mole percent of the X substituent and from about 45 to about 99.1 mole percent of the X' substituent. The preferred range is from about 0.5 to about 20 mole percent of the X substituent and from about 80 to about 99.5 mole percent of the X' substituent. For applications such as moldings, coatings, foams and the like, the copolymer should contain at least ten (10) percent by weight of the X substituent.

In the novel, simplified process of this invention, the copolymers are prepared by reacting a poly(dichlorophosphazene) having the formula —(NPCl$_2$)$_n$— in which n is from 20 to 50,000, with a mixture of a tetraalkyl orthosilicate and a substituted or unsubstituted aliphatic or aromatic alcohol, amino compound or mercaptan compound in the presence of a tertiary amine. This process is a one-step process as compared to the multiple step processes of the prior art (see U.S. Pat. No. 3,702,833).

The silicate reaction with the poly(dichlorophosphazene) in the presence of the tertiary amine is set out below; the remainder of the reaction with a substituted or unsubstituted aliphatic or aromatic alcohol, an amino compound or mercaptan compound is defined in the prior art.

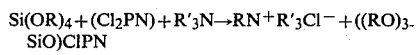

The above reaction is illustrative and shows only one chlorine substituent; it is understood the remaining chlorine may be replaced by a silicate or one of the other substituent groups as defined above and hereinafter.

U.S. Pat. No. 3,702,833 discloses a complicated, three step process for the preparation of a copolymer. Metallic sodium is reacted with a mixture of fluoroalcohols to yield sodium fluoroalkoxides. A benzene solution of a prepared copolymer of randomly distributed dichlorophosphazene and dihydroxylphosphazene units is added to the sodium fluoroalkoxides and reacted. This prepared copolymer was previously prepared by the addition of water to phosphonitrilic chloride polymer in the presence of triethylamine or pyridine. The elastomer resulting from the sodium fluoroalkoxide-prepared copolymer reaction was reacted with another substituted group to yield the final copolymer. As is evident from the description above and detailed description below, the process of this invention has several advantages over this teaching; for example, several steps are eliminated and the use of metallic sodium is eliminated.

The polymers can be used to prepare films and may be utilized in applications such as molding and coatings. They also exhibit a crosslinking reaction at room temperature in the presence of water.

DETAILED DESCRIPTION OF THE INVENTION

The polyphosphazene polymers of this invention are prepared by a simplified process in which a poly(dichlorophosphazene) polymer having the structure $-(NPCl_2)_n-$, in which n is from 20 to 50,000, is reacted with a mixture of a tetraalkyl orthosilicate and a substituted or unsubstituted aliphatic or aromatic alcohol, amino compound or mercaptan compound in the presence of a tertiary amine.

I. THE POLY(DICHLOROPHOSPHAZENE) POLYMER

Poly(dichlorophosphazene) polymers which are employed as starting materials in the process of this invention are well known in the art as illustrated in U.S. Pat. Nos. 3,370,020; 4,005,171; and 4,055,520 and the aforementioned publications of H. R. Allcock, the disclosures of which are incorporated herein by reference.

These polymers have the general formula $-(NPCl_2)_n-$, in which n may range from 20 to 50,000 or more. As described in the aforementioned references, the polymers are in general prepared by the thermal polymerization of cyclic oligomers having the formula $-(NPCl_2)_n-$, in which n is an integer of from 3 to 7, with the cyclic trimer and tetramer often comprising up to 90% of the oligomers.

The specific conditions of temperature, pressure and time employed in the thermal polymerization of the cyclic oligomers can vary considerably depending on whether or not the polymerization is catalyzed. Thus, temperatures may range from about 130° C. to about 300° C., pressures may range from a vacuum of less than about $10^{-1}$ Torr to superatmospheric and times may range from 30 minutes to about 48 hours.

A preferred process for preparing the poly(dichlorophosphazene) polymers used in the process of this invention is described in the aforementioned incorporated U.S. Pat. No. 4,005,171.

II. SUBSTITUENTS

The tetraalkyl orthosilicate which may be employed in forming the copolymers of the invention are the tetraalkyl orthosilicates of the general formula $Si(OR)_4$ where R may be a branched, straight chain or cyclic alkyl radical with from 1 to 12 carbon atoms. The alkyl radicals may vary from one site to another in the silicate or may be identical at each site. Illustration examples of the tetraalkyl orthosilicates which may be suitably employed are tetraethyl orthosilicate, tetramethyl orthosilicate, tetrabutyl orthosilicate, tetraoctyl orthosilicate, and the like. A preferred tetraalkyl orthosilicate is tetraethyl orthosilicate.

As indicated heretofore, the polyphosphazene copolymers of the invention in addition to the silicate substituent group may contain substituted or unsubstituted alkoxy, aryloxy, amino or mercapto groups.

Substituent groups represented by X' for use in these copolymers are:

The alkoxy groups (substituted or unsubstituted) may be derived from aliphatic alcohols having from 1 to 20 carbon atoms such as methanol, ethanol, propanol, isopropanol, n-butanol, sec-butanol, hexane, dodecanol and the like; fluoroalcohols, especially those represented by the formula $Z(CF_2)_nCH_2OH$ in which Z is hydrogen or fluorine and n is an integer from 1 to 10 as illustrated by trifluoroethanol, 2,2,3,3,3-pentafluoropropanol, 2,2,3,3,4,4,4-heptafluorobutanol; 2,2,3,3-tetrafluoropropanol, 2,2,3,3,4,4,5,5-octafluoropentanol, 2,2,3,3,4,4,5,5,6,6,7,7-dodecafluoroheptanol and the like. In instances where it is desired to incorporate mixed X' substituent groups in the copolymers, mixtures of the foregoing alcohols may be employed.

The aryloxy groups (substituted or unsubstituted) may be derived from aromatic alcohols including among others phenol; alkylphenols such as cresols, xylenols, p-, o-, and m- ethyl and propyl phenols and the like; halogen-substituted phenols such as p-, o-, and m-chloro and bromo phenols and di- or tri-halogen substituted phenols and the like; and alkoxy-substituted phenols such as 4-methoxyphenol, 4-(n-butoxy) phenol and the like. Mixtures of the foregoing aromatic alcohols may also be employed.

The amino groups may be derived from any of the amino compounds heretofore employed in the polyphosphazene polymer art. Thus, the amino groups may be derived from aliphatic primary and secondary amines such as methylamine, ethylamine, dimethylamine, ethylmethylamine and the like and aromatic amines such as those described in U.S. Pat. No. 4,042,561, incorporated herein by reference, as illustrated by aniline, halogen-substituted anilines, alkyl-substituted anilines, alkoxy-substituted anilines and the like.

The mercapto groups may be derived from any of the mercaptan compounds heretofore employed in the polyphosphazene polymer art. Thus, for example, the mercaptan compounds described in U.S. Pat. No. 3,974,242 to Lanier et al, incorporated herein by reference, may be utilized. Representative of suitable mercaptan compounds as described in the aforementioned patent are methyl mercaptan and its homologs ethyl, propyl, butyl, aryl and hexyl mercaptans, thiophenol, thionaphthols, benzyl mercaptan, cyclohexyl mercaptan and the like.

Preferred substituent groups represented by X' are alkoxy, especially fluoroalkoxy, and aryloxy, especially substituted phenols.

III. THE TERTIARY AMINE

The use of the tertiary amine minimizes undesirable side reactions and at the same time acts as an effective acid scavenger.

Tertiary amines which may be employed in preparing the polymers of the invention are those represented by the general structure:

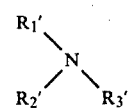

wherein $R'_1$, $R'_2$, and $R'_3$ may each be alkyl containing from 1 to 8 carbon atoms. Thus, for example, the tertiary amine may be a trialkyl amine such as trimethylamine, triethylamine, tri-isopropylamine, tri-n-propylamine, tri-isobutylamine, tri-n-butylamine, and the like. In addition, tertiary amines such as pyridine, N,N,N',N'-tetramethylethylene diamine (TMEDA), dipipyridyl ethane, 1,4 diaza bicyclo (2.2.2) octane (DABCO), N-methyl pyrolle and N-methyl morpholine can also be utilized.

The preferred tertiary amines for use in preparing the polymers of the invention are triethylamine, N,N,N',N'-tetramethylethylene diamine and pyridine.

As indicated above, the copolymers of the present invention are prepared by reacting the poly(dichlorophosphazene) polymer and a substituent mixture of a tetraalkyl orthosilicate and a substituted or unsubstituted aliphatic or aromatic alcohol, an amino compound or a mercaptan compound in the presence of a tertiary amine.

The specific reaction conditions and proportion of ingredients employed in preparing these copolymers can vary somewhat depending on factors such as the reactivity of the specific substituent mixture utilized, the particular tertiary amine employed, and the degree of substitution desired in the finished polymer. In general, reaction temperatures may range from about 25° C. to about 200° C. and times may range from 3 hours up to 7 days; lower temperatures necessitating longer reaction times and higher temperatures allowing shorter reaction times. These conditions are, of course, utilized in order to insure substantially complete conversion of the chlorine atoms in the polymer to the corresponding ester of the substituent mixture.

The above reaction is ordinarily carried out in the presence of a solvent. The solvent employed in the reaction should be a solvent for both the poly(dichlorophosphazene) polymer, the substituent mixture and the tertiary amine.

In addition, the materials in the reaction zone should be reasonably free of water, most preferably containing 0.01 percent by weight of water or less. The prevention of water in the reaction system is necessary in order to inhibit the reaction of the available chlorine atoms in the chloropolymer therewith. Examples of suitable solvents which may be employed include diglyme, triglyme, tetraglyme, toluene, xylene, cyclohexane, chloroform, dioxane, dioxalene, methylene chloride, tetrachloroethane, and tetrahydrofuran. The amount of solvent employed is not critical and any amount sufficient to solubilize the reaction mixture materials can be employed.

In general, the amount of the substituent mixture employed in the process should be at least molecularly equivalent to the number of available chlorine atoms in the polymer mixture. However, if desired, an excess of such compounds may be employed in order to insure substantially complete reaction of all the available chlorine atoms.

Also the presence of water yields crosslinks with the copolymer of this invention at room temperature, therefore, the absence of water is vital until this reaction is desired. Specifically, the alkyl groups in the silicate linkages in the copolymer of this invention will react with water (hydrolyze) to yield SiOH groups on the copolymer. The SiOH site will react with other SiOR or SiOH to give Si-O-Si crosslinks. This reaction occurs at room temperature. Its rate is controlled by the amount of silicate or water present. The resulting crosslinked product is readily realized and; due to its high inorganic character, yields improved flame retardant and heat stability properties.

The following example is submitted for the purpose of further illustrating the nature of the present invention and is not intended as a limitation on the scope thereof. Parts and percentages referred to in the example are by weight unless otherwise indicated.

EXAMPLE I

Preparation of $+OSi(OC_2H_5)_3)_2PN+$, $+(OSi(OC_2H_5)_3)(CF_3CH_2O)PN+$, $+(CF_3CH_2O)_2PN+$ Copolymer To a 10 ounce beverage bottle was charged 9.17 gms. (44 millimoles; 9.82 cc) of tetraethyl orthosilicate, $Si(OC_2H_5)_4$ 100 cc of dry tetrahydrofuran (hereinafter THF), 12.3 cc (88 millimoles) of triethylamine, 3.2 cc (44 millimoles) of trifluoroethanol, and 36.0 gms. of a 12.85% THF solution of poly(dichlorophosphazene) 4.626 gms., (39.9 millimoles) having a degree of polymerization of about 2600. After 20 hours in a 80° C. rotary bath and cooling, no PCL bonds could be detected by Infrared spectroscopy.

The THF insoluble chloride salts (triethylamine hydrochloride and tetraethylamine chloride) settled out as crystals. The remaining solution was evaporated to yield a hard, brittle film that was insoluble in THF.

An analysis of the polymeric product showed the following results:

Calculated (%) C 18.33, H 2.22, N 7.08, P 15.65, Cl 2.54. Actual (%) C 18.33, H 2.22, N 8.16, P 15.16, Cl 2.54.

The calculated results were based on 72.3% $[(CF_3CH_2O)_2PN]_n$, 4.20% $[Cl_2PN]_n$, 21.4% $[(OSi(OC_2H_5)_3)_2PN]_n$ and 6.9% $[(HO_2)PN]_n$ which were assumed products although it is recognized that the actual products represent mixtures thereof, specifically those identified above.

The mole percent for the above assumed products from trifluoroethanol and tetraethyl orthosilicate were:

| Weight % | Mole % | |
|---|---|---|
| 21.4 | 15.7 | $[(OSi(OC_2H_5)_3)_2PN]_x$ |
| 72.3 | 59.6 | $[(CF_3CH_2O)_2PN]_x$ |
| 4.2 | 7.3 | $(Cl_2PN)_x$ |
| 6.9 | 17.5 | $[(HO)_2PN]_x$ |

EXAMPLE II

Preparation of $+OSi(OC_2H_5)_3)_2PN+$, $+(OSi(OC_2H_5)_3) (ClC_6H_4O)PN+$, $+(ClC_6H_4O)_2PN+$ Copolymer To a 10 ounce beverage bottle was charged 9.17 gms. (44 millimoles; 9.82 cc) of tetraethyl orthosilicate, $Si(OC_2H_5)_4$ 100 cc of dry, alcohol free chloroform, 12.3 cc (88 millimoles) of triethylamine, 5.66 gms. (44 millimoles) of p-chlorophenol, and 55.6 gms. of a 8.35% cyclohexane solution of poly(dichlorophosphazene), (40.1 millimoles) having a degree of polymerization of about 2600. After 20 hours in a 120° C. oven, a viscous yellow solution with crystals of amino salts was obtained. Infrared spectroscopy showed no PCL bonds at 600 cm$^{-1}$ and strong, new bonds at 568, 540 and 478 cm$^{-1}$.

A solution was cast and, after drying three days in the air, a rubbery, tetrahydrofuran insoluble, film resulted.

We claim:

1. A method of preparing polyphosphazene copolymers containing randomly distributed units represented by the formulas:

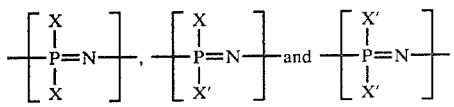

wherein X is $OSi(OR)_3$ in which R is a branched, straight chain or cyclic alkyl radical containing from 1 to 12 carbon atoms and mixtures thereof, and wherein X' is selected from the group consisting of substituted and unsubstituted alkoxy, aryloxy, amino or mercapto groups and mixtures thereof; said method comprising reacting a poly(dichlorophosphazene) polymer having the formula $—(NPCl_2)_n—$, wherein n is from 20 to 50,000, with a mixture consisting of a tetraalkyl orthosilicate and a substituted or unsubstituted aliphatic or aromatic alcohol, an amino compound or a mercapto compound in the presence of a tertiary amine.

2. The method of claim 1 wherein said tetraalkyl orthosilicate is tetraethyl orthosilicate.

3. The method of claim 1 wherein said mixture consists of tetraethyl orthosilicate and trifluoroethanol.

4. The method of claim 1 wherein said mixture consists of tetraethyl orthosilicate and p-chlorophenol.

5. The method of claim 1 wherein the X substituent is between about 0.1 and about 55 mole percent and the X' substituent is between about 45 and about 99.1 mole percent.

6. The method of claim 1 wherein said tertiary amine is triethylamine.

* * * * *